United States Patent [19]

Stall et al.

[11] Patent Number: 5,571,047
[45] Date of Patent: Nov. 5, 1996

[54] CONSTANT VELOCITY UNIVERSAL JOINT OF THE TRIPODE TYPE

[75] Inventors: Ing. E. Stall, Neunkirchen-Seelscheid; Winfried Busch, Köln; Dieter Jost, Neunkirchen, all of Germany

[73] Assignee: GKN Automotive AG, Seigburg, Germany

[21] Appl. No.: 194,489

[22] Filed: Feb. 10, 1994

[30] Foreign Application Priority Data

Feb. 20, 1993 [DE] Germany .................. 43 05 278.9

[51] Int. Cl.6 ........................................ F16D 3/205
[52] U.S. Cl. ........................ 464/111; 464/123; 464/905
[58] Field of Search ....................... 464/111, 120, 464/123, 124, 132, 905

[56] References Cited

U.S. PATENT DOCUMENTS

| | | | |
|---|---|---|---|
| 5,167,583 | 12/1992 | Bensinger et al. | 464/111 |
| 5,203,741 | 4/1993 | Turner et al. | 464/111 |
| 5,330,389 | 7/1994 | Jost et al. | 464/111 |
| 5,376,049 | 12/1994 | Welshof et al. | 464/111 |

FOREIGN PATENT DOCUMENTS

| | | | |
|---|---|---|---|
| 426186 | 5/1991 | European Pat. Off. | 464/111 |
| 2204659 | 11/1988 | United Kingdom | 464/111 |

*Primary Examiner*—Daniel P. Stodola
*Assistant Examiner*—Eileen A. Dunn
*Attorney, Agent, or Firm*—Harness, Dickey & Pierce PLC

[57] ABSTRACT

A constant velocity universal joint of the tripode type increases the torque transmitting capacity of the joint while the size of the joint remains unchanged, and, respectively, with a predetermined torque capacity, to reduce the size of the joint, especially the outer diameter of the joint. This is achieved in that the joint is guided entirely by the outer roller and that the securing means for the roller assembly on the tripode arm are displaced radially inwardly with reference to the joint axis.

5 Claims, 3 Drawing Sheets

CONSTANT VELOCITY UNIVERSAL JOINT OF THE TRIPODE TYPE

FIELD OF THE INVENTION

The present invention relates to constant velocity universal joints. More particularly, the present invention relates to constant velocity universal joints of the tripode design.

BACKGROUND OF THE INVENTION

With prior art constant velocity universal joints of the tripode type, it is frequently the inner roller which guides the roller assembly in the guiding track. At the same time, the inner roller is frequently provided with axial securing means which, via a pressure disc, support the needle bearing and the outer roller, with the outer roller, at the inner end, being supported on a collar provided at this end. At the same time, the inner roller is supported inside the guiding groove on its radial outer wall in order to prevent the roller assembly from tilting (EP-OS 0426186). The disadvantage of the prior art design is that, because of its additional functions, the inner roller has a relatively great axial length. This axial length determines the height of the guiding groove, as a result of which the outer diameter of the outer joint part is rather great.

To provide the roller assembly with the necessary pivoting ability and thus to achieve a predetermined articulation angle, the neck of the arm is generally rather weak, which necessarily has a negative effect on the torque transmitting capacity.

It is the object of the present invention to increase the torque transmitting capacity of a constant velocity universal joint of the tripode type while retaining its size and especially to increase the strength of the region of transition from the inner joint part to the spherical arm.

It is also within the scope of the objective of the present invention to reduce the size of the joint while maintaining its torque transmitting capacity.

The objective is achieved in that each outer roller, at its axially outer end with reference to the axis of the spherical arm, comprises a radially inwardly pointing collar supporting the inner roller axially outwardly, that at the cylindrical inner wall of the outer roller there is arranged axially inner axial securing means supporting the inner roller via a pressure disc axially inwardly, and that the neck of the inner joint part, starting from the hub of the inner joint part, extends generally tangentially from the hub continuously towards the spherical arm with an ever decreasing ovaloid shape, with no necking being provided in the region of transition from the neck to the spherical arm.

By arranging the axial securing means at the inner wall of the outer roller and by positioning them at the outer roller end facing the joint axis, it is possible to considerably shorten the length of the inner roller and also of the associated needle beating.

As in this case parallel alignment of the roller assembly is entirely effected by the outer roller and as the axial securing means are still located in the guiding region of the outer roller, it is possible to considerably shorten the roller assembly in the radial direction with reference to the joint axis.

As a result of the short design of the inner roller, it is possible to provide the region of transition from the hub of the inner joint part to the spherical arms, i.e. the so-called neck, with a much greater thickness, which results in an increase in the torque transmitting capacity of the constant velocity universal joint.

According to a further embodiment of the invention it is proposed that, in the circumferential direction, the neck of the spherical arm should feature a greater resistance moment than in the axial direction.

This measure results in an additional increase in the torque transmitting capacity.

Furthermore, because of the axially outer collar, with reference to the axis of the spherical arm, the outer roller is provided with an increased resistance moment, as a result of which the circumferential force is distributed more effectively to the largest possible number of bearing needles.

According to an advantageous feature of the invention, the outer roller, with reference to the axis of the spherical arm, projects axially outwardly beyond the needle bearing and the inner roller merely by an amount corresponding to the thickness (h) of the collar.

This feature advantageously contributes towards reducing the outer diameter of the outer joint part.

In a further advantageous embodiment of the invention, the outer limiting faces of the guiding grooves, in each case, are provided with two bead-like stop faces arranged at a distance from the circumferentially extending guiding tracks and extending along the axial length of the guiding grooves.

This results in production-technical advantages because all radii can be kept relatively large, which means that both the broaching operation and the production of the outer joint part by a pressing process are simplified.

Furthermore, because there exists a defined contact line at the bead-shaped stop faces, the hardening operation may be limited to said stop faces.

SUMMARY OF THE INVENTION

The present invention relates to a constant velocity universal joint of the tripode type comprising an outer joint part provided with three circumferentially distributed axially extending axis-parallel guiding grooves having two associated guiding tracks each. The present invention further comprises an inner joint part provided with spherical arms which correspond to the guiding tracks and which extend radially with reference to the joint axis, as well as roller assemblies which are arranged on the arms and consist of an inner roller and an outer roller supported on the inner roller via a needle bearing.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
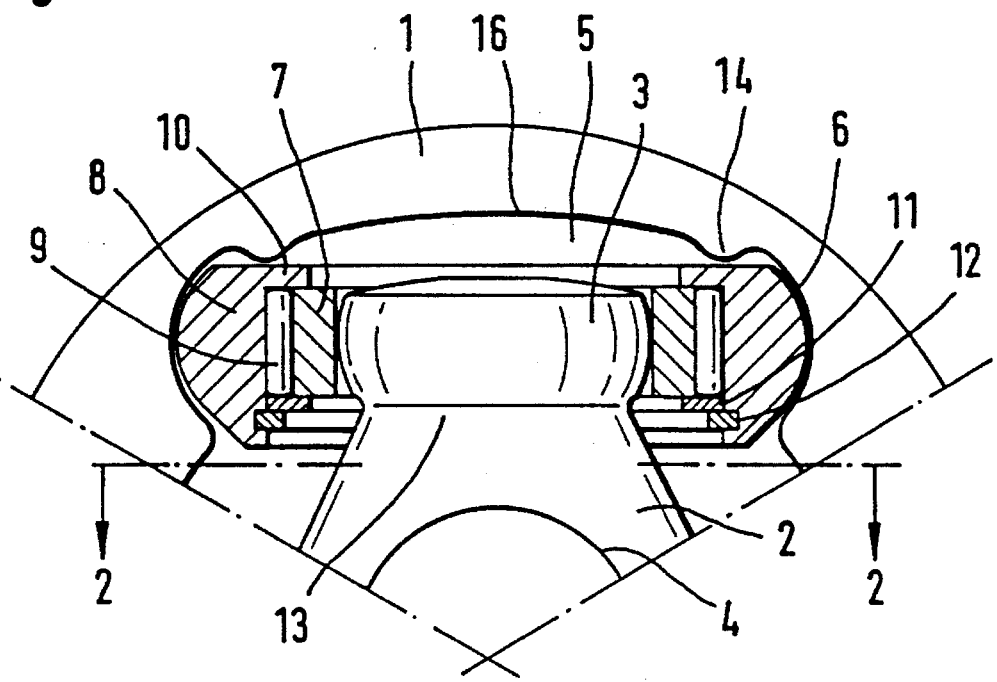
FIG. 1 is a partial section through a constant velocity universal joint in accordance with the invention.

The constant velocity universal joint of the present invention which is partially shown in section in FIG. 1 and substantially consists of an outer joint part 1 and an inner joint part 2. While only one of the three circumferentially distributed axially extending axis-parallel guiding grooves has been illustrated, it is to be understood that the constant velocity joint of the present invention has a total of three circumferentially spaced guiding grooves identical to the one illustrated in the figures.

The outer joint part 1 is provided with three circumferentially distributed guiding grooves 5, with each of these being associated with two guiding tracks 6.

The inner joint part is provided with three spherical arms 3 which, with reference to the joint axis, point radially outwardly and which, each, receive an inner roller 7 which, in turn, is supported in an outer roller 8 via a plurality of needle bearings 9. Furthermore, the inner joint part 2 is provided with a hub having an inner bore 4 which serves to accommodate a shaft, via a spline connection or other methods of connection known in the art.

At its radially outer end, the outer roller 8 is provided with a collar 10 which, with reference to the axis of the spherical arm 3, points radially inwardly and which, with reference to the axis of the spherical arm 3, supports the plurality of needle bearings 9 and the inner roller 7 to prevent any axial outward movement. The axially inner end of the outer roller 8 is provided with axial securing means 12 which, via a pressure disc 11, hold the roller assembly together and support it to prevent an axial inward movement.

The assembly as described above ensures that, with reference to the axis of the spherical arm 3, the length of the entire roller assembly is reduced considerably.

Figure 2:
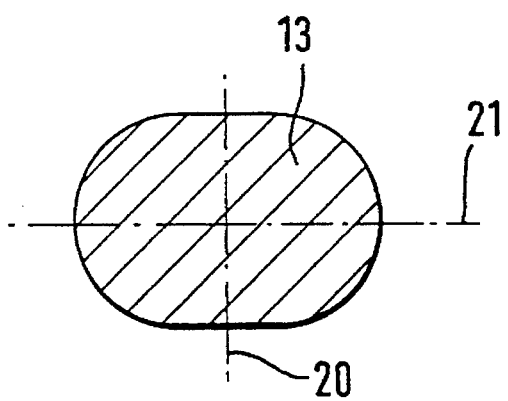
FIG. 2 is a section through the neck in accordance with line 2—2 shown in FIG. 1.

FIG. 2 shows a section 2—2 through the neck 13 of the spherical arm 3. As can be seen in FIG. 2, neck 13 has an oval shaped cross-section having a minor axis 20 and a major axis 21 with the resistance moment in the circumferential direction being very much greater than in the axial direction.

Figure 3:
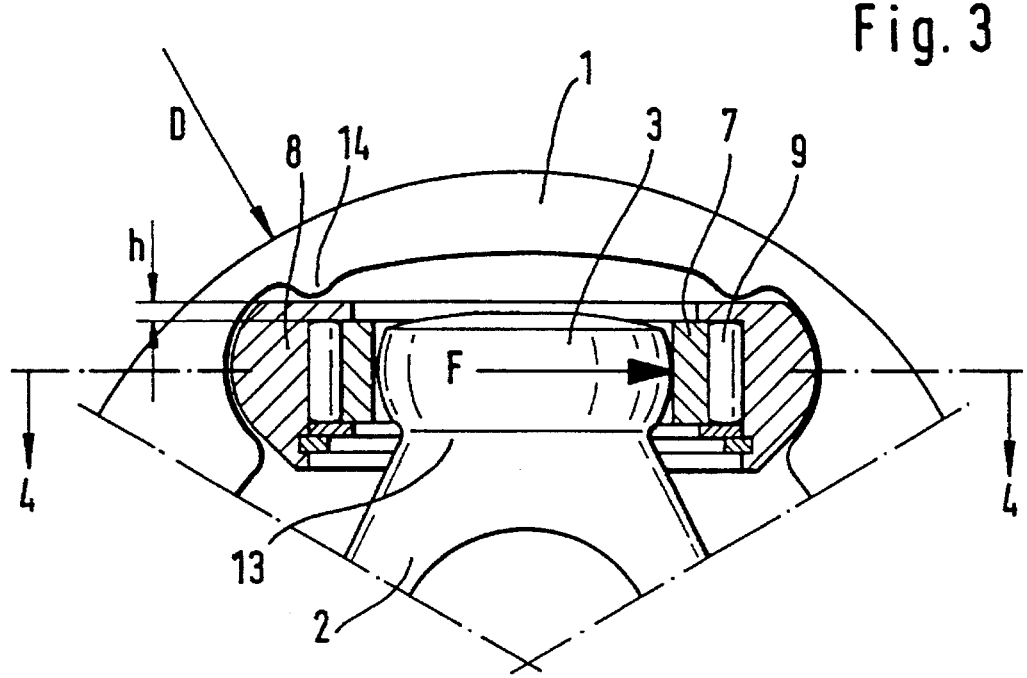
FIG. 3 shows the position of the point at which the spherical arm applies its force to the inner roller.

FIG. 3 shows the point where the circumferentially directed force F acts on the inner roller. As can be seen in FIG. 3, the application point of force F is displaced axially outwardly (with reference to the axis of the spherical arm 3).

Figure 5:
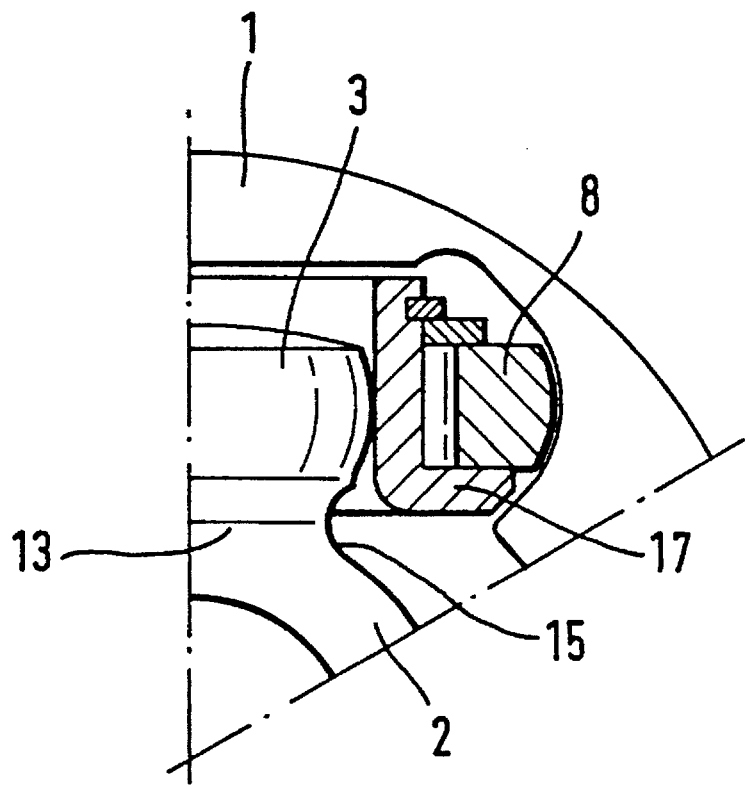
FIG. 5 shows a typical prior art design of a tripode joint assembly.

FIG. 5 shows a conventional cross-section 15, and it can be seen by comparing FIG. 5 with FIG. 3 that the design in accordance with the present invention results in a considerable thickening of the neck 13 of the spherical arm 3. The neck 13 of the inner joint part 2, starting from the hub of the inner joint part, includes an outer surface which extends generally tangentially from the hub towards the spherical arm 3 with a continuously decreasing ovaloid shape.

Figure 4:
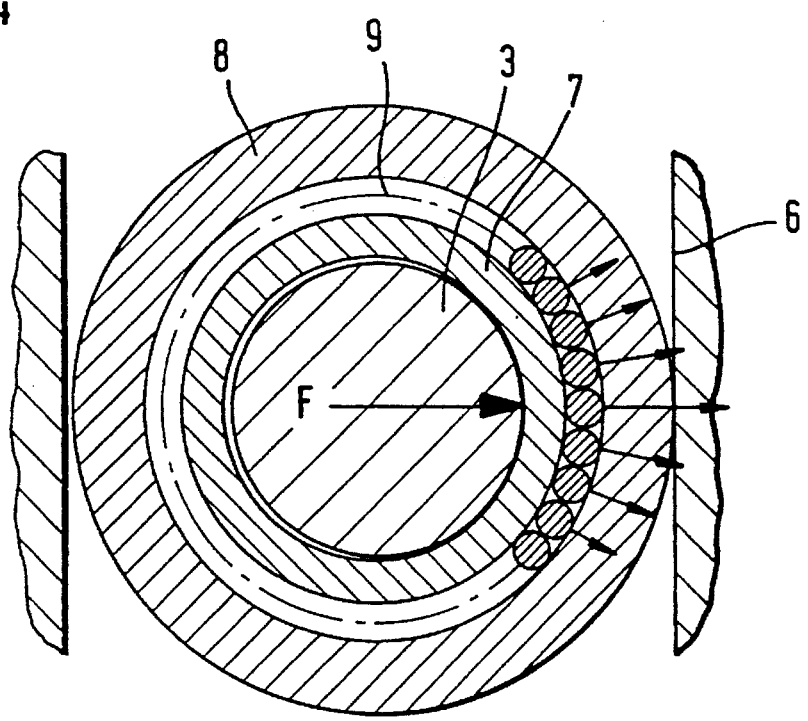
FIG. 4 shows the distribution of forces of the roller assembly in accordance with line 4—4 shown in FIG. 3.

FIG. 4 illustrates the distribution of forces of the entire roller assembly and its effect on the guiding tracks 6.

The outer limiting faces (16) may be provided with stop faces 14 which axially extend through the guiding groove. Said stop faces 14 have an advantage in that the guiding groove 5 may be provided with greater radii which facilitate the production-technical process. Furthermore, only the stop faces 14 need to be hardened because all the remaining faces of the outer limiting face (16) remain contact-free.

FIG. 5 shows a conventional prior art roller assembly having an inner roller 17 and a conventional cross-section 15 for inner joint part 2 according to the state of the art.

What is claimed is:

1. A constant velocity joint defining a joint axis, said constant velocity joint comprising:

an outer joint part having three circumferentially distributed axially extending axis-parallel guiding grooves, each groove having two associated guiding tracks;

an inner joint part having a hub and three necks carrying spherical trunnions, each neck defining a radial axis, each of said necks being disposed between said hub and said spherical trunnion to position said trunnion into a respective guiding groove between said associated guiding tracks, said neck having a width, said width continuously decreasing from said hub to said spherical trunnion; and a roller assembly arranged on each of said three spherical trunnions, said roller assembly comprising an inner roller, an outer roller disposed around said inner roller and a needle bearing disposed between said inner and outer rollers, said outer roller having a collar extending towards said radial axis at one end disposed radially outwardly with respect to said joint axis for prohibiting movement of said inner roller radially outward along said radial axis relative to said outer roller, said outer roller further having securing means for prohibiting movement of said inner roller radially inward along said radial axis relative to said outer roller, said securing means being disposed at the end of said outer roller opposite to said collar.

2. The constant velocity joint according to claim 1 wherein said collar has a thickness in the radial direction with respect to said joint axis, said outer roller extending radially outwardly generally parallel to said radial axis beyond said needle bearing and said inner roller by said thickness of said collar.

3. The constant velocity joint according to claim 1 wherein each of said three axially extending axis-parallel guiding grooves further have two abutment faces extending along the axial length of said guiding grooves, said abutment faces engaging said collar of said outer roller to prohibit movement of said outer roller outward along said radial axis.

4. The constant velocity joint according to claim 1 wherein said neck has a greater resistance moment in the circumferential direction with respect to said joint axis than in the axial direction with respect to said joint axis.

5. The constant velocity joint according to claim 4 wherein, said neck is ovaloid in cross section, said cross section having a major axis disposed generally perpendicular to said radial axis to define said width.

* * * * *